LOUIS A. ULE
INVENTOR.

BY
ATTORNEY

LOUIS A. ULE
INVENTOR.

BY
ATTORNEY

United States Patent Office 3,005,151
Patented Oct. 17, 1961

3,005,151
PHASE METER
Louis A. Ule, Alhambra, Calif., assignor to Gilfillan Bros., Inc., Los Angeles, Calif., a corporation of California
Filed Feb. 26, 1957, Ser. No. 642,357
21 Claims. (Cl. 324—57)

This invention relates to phase measurements, and more particularly to a method of and apparatus for determining the phase shift of a sinusoidal signal passing through a network under test.

It is at present the practice to employ a sine wave generator, a calibrated phase shifter, and a cathode-ray oscilliscope for measuring the phase shift of a network. The output of the sine wave generator is impressed on both the network and the adjustable phase shifter. The outputs of both the phase shifter and the network are then impressed respectively on the horizontal and vertical deflection means of a cathode-ray oscilliscope and the phase shifter is adjusted until a straight line is produced on the oscilliscope. The amount of phase shift produced by the phase shifter is then equal to the phase shift produced by the network under test.

This method of phase measurement has proved fairly accurate and may be performed within a reasonable time without great difficulty when sine waves are employed having frequencies of several cycles per second or having substantially higher frequencies. However, for frequencies of about one or less than one cycle per second, the above-described method is inaccurate, requires a considerable amount of time to perform and is extremely tedious for a human operator to perform. This for the reason that the elliptical lines forming a pattern called a Lissajous pattern on the oscilliscope move very slowly. Thus, by the time an operator makes a correction, it is very likely that he has over-corrected. Furthermore, it is difficult for an operator to visualize what phase error exists between the sine wave outputs of the network and the phase shifter after one or more seconds have elapsed.

The present invention overcomes these and other disadvantages of the prior art by providing a method of measuring the phase shift of a network including the steps of generating a sinusoidal voltage and an alternating signal having substantially the same half-periods, impressing the sinusoidal voltage on the network to produce a signal at the output of the network, stopping the generation of the alternating signal at a time when the amplitudes of the alternating and output signals bear a predetermined relationship with respect to each other, starting the generation of the alternating signal at a time when the amplitudes of the signals cease to bear the predetermined relationship with respect to each other, and indicating the length of time that the generation of the alternating signal is stopped. By using this method, the phase shift of a network may be measured reasonably accurately and easily and quickly.

Any one of several criteria may be employed to satisfy the above-mentioned predetermined relationship. In addition, the alternating signal may be generated in phase or 180 electrical degrees out of phase with respect to the sinusoidal voltage. A predetermined relationship generally involves the polarity or polarities of some signal or signals. The stop gate may be generated when the potential of the network output signal is positive and simultaneously the polarity of the alternating signal is negative. The complement or reverse of this gating logic may also be employed. Further, the predetermined relationship may be alternatively defined as the condition under which both of these signals are positive. The complement or reverse of this gating logic again may also be employed.

A particularly simple and effective gating logic would stop the generation of the alternating signal when it and the sinusoidal output of the network were of the same polarity and permit it to resume and continue as soon as and as long as they are of opposite polarity.

It is also a feature of the invention that any of the embodiments of the above-described method may be conveniently and inexpensively mechanized. For example, a phase meter may be provided including a signal generator for both impressing a sinusoidal voltage on the network to produce an output signal therefrom and for producing an alternating signal synchronously with the sinusoidal voltage having half-periods equal to those of the sinusoidal voltage, a gating circuit responsive to the network output signal and to the alternating signal for impressing a stop gate on the signal generator to stop the generation of the alternating signal at a time when the amplitudes of the signals bear a predetermined relationship with respect to each other, and means responsive to the stop gate for indicating its time width.

According to another feature of the invention, the network output signal is added to a sinusoidal alternating signal and a gating circuit including a voltage divider connected between the output of the network and the alternating signal output of the signal generator, and an amplifier is connected to a tap on the voltage divider, the tap having a zero potential when the network output and alternating signals are 180 electrical degrees out of phase.

If the above-mentioned indicator means is not provided with an input representative of the frequency of the sinusoidal voltage and the alternating signal, it nevertheless may be employed to indicate the phase shift of the network at specific frequencies. According to this feature of the invention, the indicator means may include an index and a dial, the index being movably mounted across the face of the dial, the face of the dial having several rows of indicia thereon corresponding to different frequencies of the sinusoidal voltage in the alternating signal.

According to another aspect of the invention, the signal generator mentioned above may include a motor having a driving mechanism for generating the sinusoidal voltage, second means responsive to the movement of the driving means for generating the alternating signal, and third means responsive to the stop gate to stop mechanical movement of the alternating signal generating means without stopping the operation of the driving mechanism or the sinusoidal voltage generating means.

The indicator means may also be constructed to indicate the phase shift of the network to a signal of any frequency. In this case, the indicator means preferably includes an integrator and the following are additionally provided: fourth means to impress an integrand signal on the indicator proportional to the frequency of the sinusoidal voltage in the alternating signal, and fifth means responsive to the stop gate for gating the integrand signal to the indicating means only when the stop gate is generated.

The invention also contemplates the use of several alternative devices for producing the integrand signal. One such device may include the fourth and fifth means as recited above, the fourth means comprising a mechanical differential in the signal generator having input means connected from the driving mechanism, first output means connected through the above-mentioned third means to the second means and second output means connected to the integrator; the integrator including means to indicate the displacement of a mechanical movement, the fifth means being connected between the second output means of the mechanical differential and the indicator means to prevent movement of said integrator through said mechanical differential in response to movement of the driving mechanism except when the stop gate is generated.

Alternatively, the fourth means may include sixth means to adjust the magnitude of the integrand signal in proportion to the speed of the motor. In this case, the adjustment means may be manually operated to control both the speed of the motor and the magnitude of the integrand signal simultaneously. For example, a ganged adjustment may be provided. Alternatively, the sixth means may include a tachometer type generator connected to the driving mechanism.

According to still another feature of the invention, the integrand signal may be provided by a tachometer type generator connected from the driving mechanism and a tachometer gate for passing the output voltage of the tachometer generator to the integrator only during the time the stop gate is generated, the above-mentioned integrator including dial means having indicia thereon and an index movably mounted adjacent the dial to indicate the phase shift of the sinusoidal voltage passing through the network, and a velocity servo responsive to the output of the tachometer gate for moving the index across the dial at a rate proportional to the output voltage of the tachometer generator, but only during the time that the stop gate is generated.

It is therefore an object of the invention to provide a method of phase measurement which may be easily and quickly performed.

Still another object of the invention is to provide a phase meter and a method of phase measurement which may be employed to measure accurately the phase shift of a network under test at very low frequencies.

A further object of the invention is to provide a method of phase measurement which may be easily and economically mechanized.

Still a further object of the invention is to provide a phase meter having a single means to indicate the phase shift of a network for any selected frequency.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only and are not intended as a definition of the limits of the invention.

Figure 1:
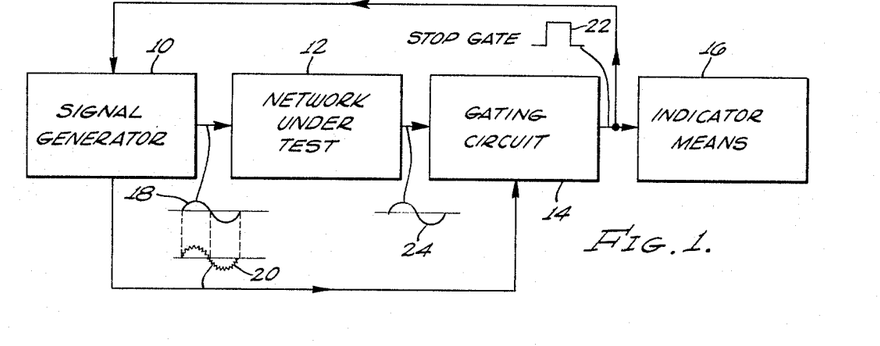
FIG. 1 is a block diagram of one embodiment of the apparatus of the invention.

In the drawings in FIG. 1 a signal generator 10 is shown connected to a network under test indicated at 12 and a gating circuit 14, gating circuit 14 also having an input from network 12. Gating circuit provides a stop gate output to which both signal generator 10 and indicator means 16 must be responsive.

Although apparatus is shown in block diagram form in FIG. 1, much of the apparatus may be replaced with hand operation to perform the method of the invention. This method includes the steps of generating a sinusoidal voltage and an alternating signal having substantially the same half-periods, impressing the sinusoidal voltage on said network to produce a signal at the output of the network, stopping the generation of the alternating signal within a length of time relatively short compared to the period of the alternating signal and at a time when the amplitudes of the alternating and output signals bear a predetermined relationship with respect to each other, maintaining the amplitude of the output signals substantially constant and at a value it reaches when its generation is stopped, starting the generation of the alternating signal again from the stopping value within a length of time short compared to the period of the alternating signal and at a time when the amplitudes of the signals cease to bear the predetermined relationship with respect to each other, and indicating the length of time that the generation of the alternating signal is stopped.

In the embodiment of the invention shown in FIG. 1, signal generator 10 is provided for producing sinusoidal voltage indicated at 18 and an alternating signal 20. It is to be noted that the alternating voltage 20 need not necessarily in all cases have any particular shape except that it must have half periods equal in duration to the half periods of the sinusoidal voltage. However, only four types of gating logic may be included in gating circuit 14 if alternating signal is not a sinusoidal voltage. Each of these types is as follows: stop gate indicated at 22 is generated when the output indicated at 24 of network 12 is positive and alternating signal 20 is positive, signal 24 is negative and signal 20 is negative, signal 24 is positive and signal 20 is negative, and signal 24 is negative and signal 20 is positive. If the first and second types of logic in this list are employed, preferably alternating signal 20 is generated 180 degrees out of phase with respect to sinusoidal voltage 18. This means that indicator means 16 may be so set to read from zero to 360 degrees phase shift. However, this need not necessarily be the case since indicator means 16 may be set to read plus or minus 180 degrees when the phase shift measurement is started.

It is to be further noted that the first two types of logic may be combined or alternatively the second two types of logic may be combined. For example, the gating circuit may produce stop gate 22 both when signals 24 and 20 are positive and when both signals 24 and 20 are negative. Alternatively, stop gate 22 may be produced by gating circuit 14 both when signal 24 is positive and signal 20 is negative and when signal 24 is negative and signal 20 is positive.

Alternatively, gating circuit 14 may simply be an adder adapted to produce stop gate 22 when the sum of signals 24 and 20 are positive, or alternatively, negative. Preferably alternating signal 20 is generated 180 electrical degrees out of phase with sinusoidal voltage 18 and when the sum of signals 24 and 20 are taken so that indicator means 16 may read from zero to 360 degrees phase shift rather than be set initially at either plus or minus 180 degrees phase shift.

In still another alternative logical form, gating circuit may subtract signal 24 from 20 or vice versa and produce a stop gate 22 when the difference between signals 24 and 20 are positive. Alternatively, stop gate 22 may be produced when the difference between signals 24 and 20 is negative. Whenever the signals 24 and 20 are added or subtracted from each other, alternating signal 20 must be a sinusoidal voltage.

As long as the phase difference between sinusoidal voltage 18 and alternating signal 20 is fixed, this difference may be any fixed value. It is to be noted that indicator means 16 may be provided with a zero adjustment for this purpose.

In the operation of the embodiment of the invention shown in FIG. 1, signal generator produces sinusoidal voltage 18 and alternating signal 20, sinusoidal voltage 18 being impressed on network 12 to produce output signal 24. Signals 24 and 20 are then compared in gating circuit 14 and stop gate 22 is generated when any one of the predetermined logical conditions recited above exists. Stop gate 22 is impressed on signal generator 10 to stop the generation of reference signal 20 for a length of time to cause signals 24 and 20 to be in phase or 180 degrees out of phase. During the time that the generation of reference signal 20 is stopped, indicator means 16 advances. When the signal 24 is in phase or 180 degrees out of phase with reference signal 20 the stop gate is no longer generated, the generation of reference signal 20 resumes and the indicator means 16 stops at the correct phase reading.

Figure 2:
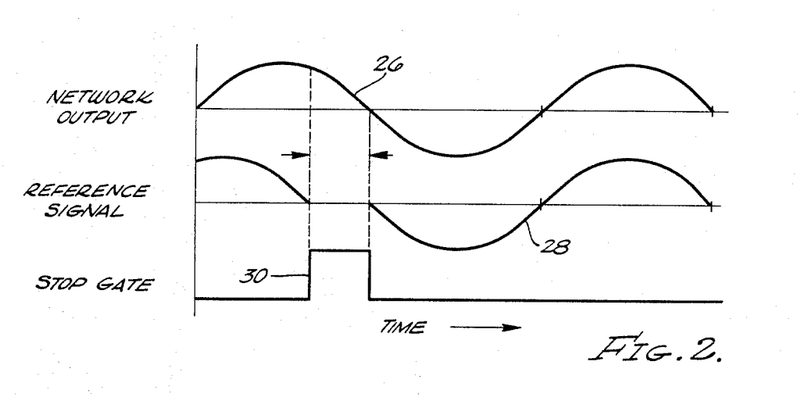
FIG. 2 is a graph of a group of waveforms characteristic of one specific mode of operation of the embodiment of the invention shown in FIG. 1.

If stop gate 22 is generated only when alternating signal 20 is negative and network output signal 24 is positive, waveforms may be produced as indicated in FIG. 2. Network output is there indicated at 26, reference signal 20 is varied in shape as indicated at 28, and a stop gate 32 is generated in time correspondence to the shape of waveforms 26 and 28.

Figure 3:
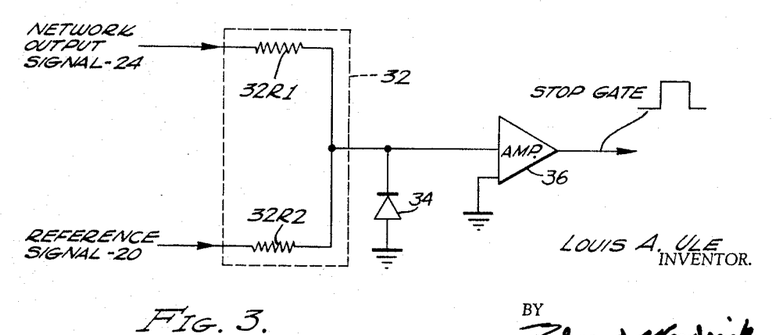
FIG. 3 is a diagrammatic view of one of the blocks shown in FIG. 1.

An alternative form of a gating circuit is shown in FIG. 3 including a voltage divider 32 which is connected to a negative clamping diode 34 that is employed to clamp all negative input signals to an amplifier 36 to ground and to pass all positive input signals. The output of network 12 is then fed to the one leg of the voltage divider 32 and the alternating signal output of signal generator 10 is fed to the other leg of the voltage divider 32. Voltage divider 32 includes resistors 32R1 and 32R2. Resistors 32R1 and 32R2 are preferably equal in resistance when the amplitudes of sinusoidal voltage 18 and alternating signal 20 are equal in amplitude. As stated previously, in this case, alternating signal 20 must also be a sinusoidal voltage since the effect of introducing both voltage 18 and signal 22 to voltage divider 32 is to add them. If the amplitudes of voltage 18 and signal 20 are different, the resistances of resistors 32R1 and 32R2 should be appropriately changed so that their mutual connection will be zero potential when signals 24 and 20 are exactly in phase or 180 degrees out of phase.

In the operation of the gating circuit shown in FIG. 3, amplifier 36 simply produces a stop gate 38 whenever the sum of the signals 24 and 20 is positive. Clamping diode 34 and amplifier 36 may be replaced with a relay amplifier and relay, the unilateral conduction characteristic of relay amplifiers being well known in the art where the relay amplifier is biased to cut-off.

Figure 4:
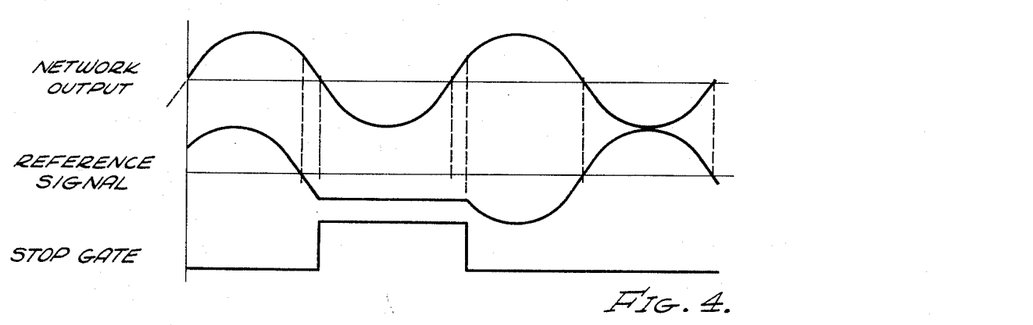
FIGS. 4 and 5 are graphs of waveforms characteristic of two other different modes of operation of the apparatus shown in FIG. 1.
Figure 5:
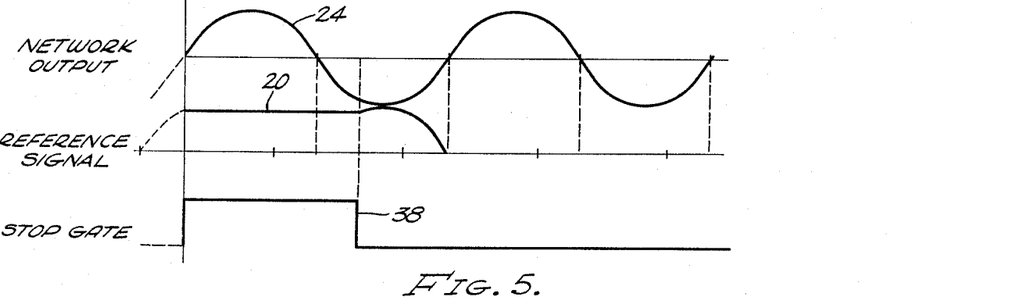

FIGS. 4 and 5 are waveforms characteristic of the operation of the embodiment of the invention shown in FIG. 1 when the gating circuit of FIG. 3 is employed. The network output and reference signals are appropriately labeled with a stop gate. The time correspondence of each are shown in each of the FIGS. 4 and 5. FIG. 4 is a graph of these waveforms when the sum of the signals 24 and 20 are taken and a stop gate is generated when the sum of the signals has a negative polarity. The waveforms of FIG. 5 are characteristic of the operation of specific gating circuit shown in FIG. 3, i.e. when the sum of signals 24 and 20 are taken and stop gate 38 is generated when the sum of these signals is a composite signal of a positive polarity.

Figure 6:
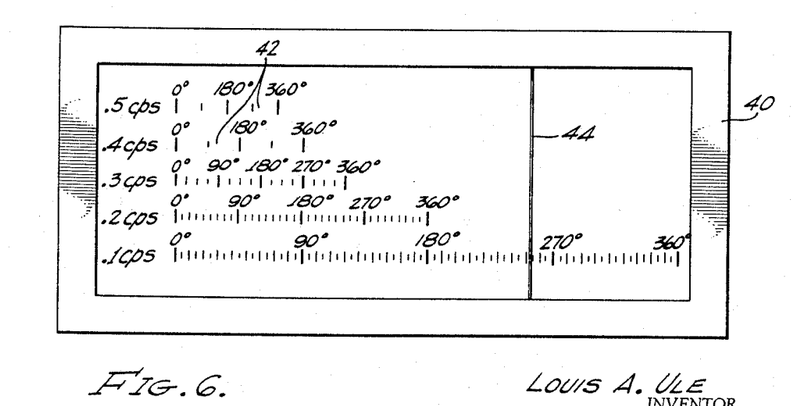
FIG. 6 is a dial face of indicator means shown in FIG. 1.

FIG. 6 is a front elevational view of a dial 40 which may be included in indicator means 16. The face of the dial is provided with a plurality of rows of indicia 42 corresponding to different frequencies, for example, from 1/10 to .5 cycle per second. The dial 40 may be employed when no input is provided to indicator means 16 representative of the frequency of sinusoidal voltage 18 or alternating signal 20. Indicator means 16 may also be provided with an index 44 to move across the face of the dial 40 a distance proportional to the time width of stop gate 22. Hence, the phase shift of any of the specific frequencies of .1 to .5 cycle per second may be read directly from the dial 40 by comparing the position of index 44 with a specific row of indicia 42.

Figure 7:
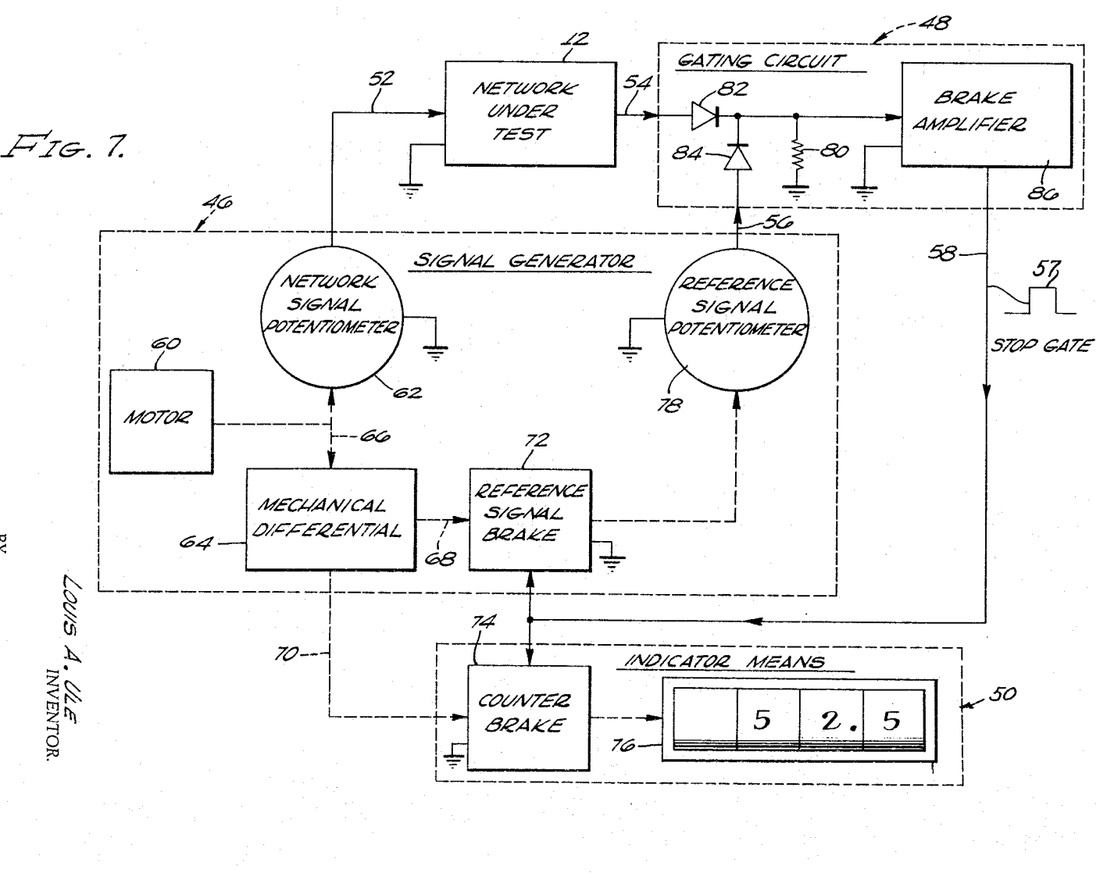
FIG. 7 is a schematic diagram of still another embodiment of the apparatus of the invention.

In FIG. 7 a different embodiment of the invention is shown including a special signal generator 46 adapted to function with network 12 and a gating circuit 48 to produce an indication on indicator means 50 of the phase shift of network 12 regardless of the frequency of sinusoidal voltage to network 12 or the alternating signal to gating circuit 48. A sinusoidal voltage is impressed upon network 12 through a lead 52. A network output signal is impressed upon gating circuit 48 on a lead 54. Alternating signal is impressed upon gating circuit 48 by signal generator 46 on a lead 56. Gating circuit 48 then produces a stop gate 57 on a lead 58 which is impressed upon indicator means 50.

Signal generator 46 preferably comprises a motor 60 which is mechanically connected to a network signal potentiometer 62 and a mechanical differential 64 having input means at 66 and first and second output means 68 and 70, respectively, connected to a reference signal brake 72 and a counter brake 74, reference signal brake 72 being an integral part of signal generator 46 and counter brake 74 being included in indicator means 50. Counter brake with mechanical differential 64 actually form a part of means to operate (to introduce an integrand signal to) an indicator 76 in indicator means 50 which may be a rotating disc type or speedometer type Veeder Root counter. Signal generator 46 also includes a reference signal potentiometer 78 which is connected at the output of reference signal brake 72 for impressing the alternating signal on lead 56.

In order that both reference signal brake 72 and counter brake 74 may be operated with a single stop gate 57, preferably reference signal brake 72 is normally maintained in an unbraking state and counter brake 74 is normally maintained in a braking state. Alternatively, a monostable multivibrator or an additional inverter amplifier may be provided in the braking amplifier, and both brakes 72 and 74 may be normally maintained in the unbraking state. Alternatively also, the brake amplifier may first operate a relay with two sets of contacts, one set normally closed, the other normally open and each set in series with the sources of braking current and one of the brakes respectively.

Potentiometers 62 and 78 simply form low frequency alternating current generators. Any convenient substitution for these devices may, of course, be appropriately made.

Gating circuit 48 includes a resistor 80 which is connected from a pair of diodes 82 and 84 that are respectively connected from network output signal lead 54 and alternating signal lead 56. The output of resistor 80 is impressed upon brake amplifier 86 which is employed to produce stop gate 57.

Gating circuit 48 produces stop gate 57 when either or both the network output signal appearing at lead 54 and alternating signal appearing at lead 56 are positive.

Figure 8:
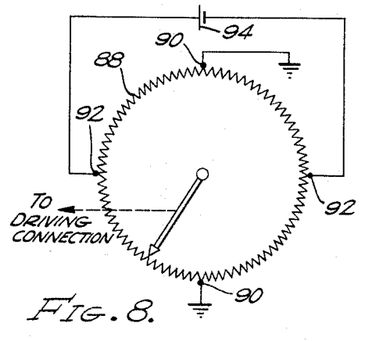
FIGS. 8 and 9 are detailed schematic diagrams of alternative devices which may be employed in two of the blocks shown in FIG. 7.
Figure 9:
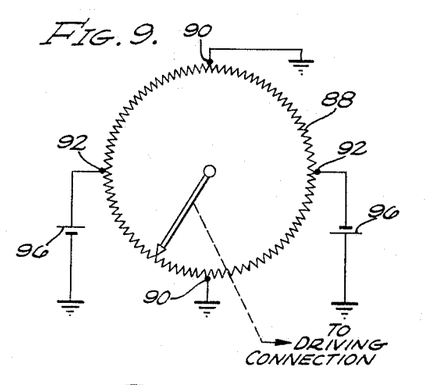

Alternative forms of network signal potentiometer 62 and reference signal potentiometer 78 are shown in FIGS. 8 and 9. In FIG. 8, a potentiometer 88 is shown having two taps 90 connected to ground and another pair of taps 92 connected 45 degrees from the taps 90 to a source of potential 94.

In FIG. 9 the potentiometer 88 is again shown having the two taps 90 connected to ground. However, taps 92 are respectively connected from separate sources of potential 96 which are connected to ground but with opposite polarities.

Figure 10:
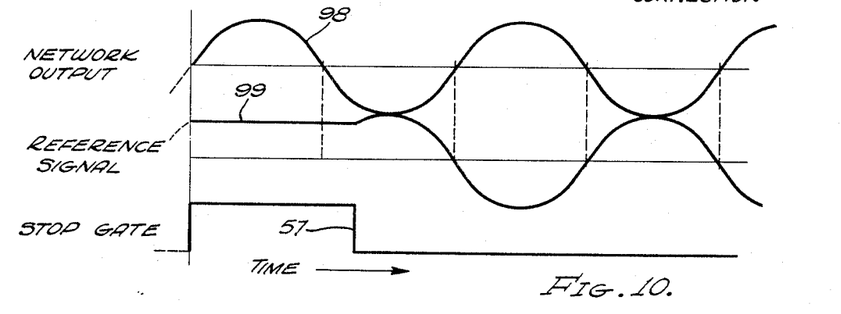
FIG. 10 is a graph of a group of waveforms characteristic of the operation of the apparatus shown in FIG. 7.

Waveforms characteristic of the operation of the embodiment of the invention shown in FIG. 7 are shown in FIG. 10 including a network output signal 98, a reference signal 99 and stop gate 57.

In the operation of the embodiment of the invention shown in FIG. 7, motor 60, which preferably runs at a constant speed, drives network signal potentiometer 62 directly and reference signal potentiometer 78 through mechanical differential 60 and brake 72. The signal generated by reference signal potentiometer 78 may be initially 180 degrees out of phase with the output signal of network signal potientiometer 62. If this is the case, at time zero as indicated in FIG. 10 the output signal of network 12 may be leading the output signal of reference signal potentiometer 78 by more than 180 degrees. Gating circuit 48 will produce stop gates as indicated at 57 in FIG. 10 to cause reference signal brake 72 to operate to thereby stop the generation of reference or the alternating signal impressed on gating circuit 48 over lead 56. At the same time, stop gate 57 will normally release counter brake 74 and permit differential 64 to rotate counter 76. The amount counter 76 rotates will thus be proportional to the time width of the stop gates 57 shown in FIG. 10. This will also be a measure of the phase shift of network 12. After counter 76 has been operated for this length of time, reference signal brake will then be de-energized and counter brake 74 returned to its braking position. In this case, differential 64 will then drive reference signal potentiometer 78 and the reference signal 99 will continue to be generated 180 degrees out of phase with the output of network 12.

Figure 11:
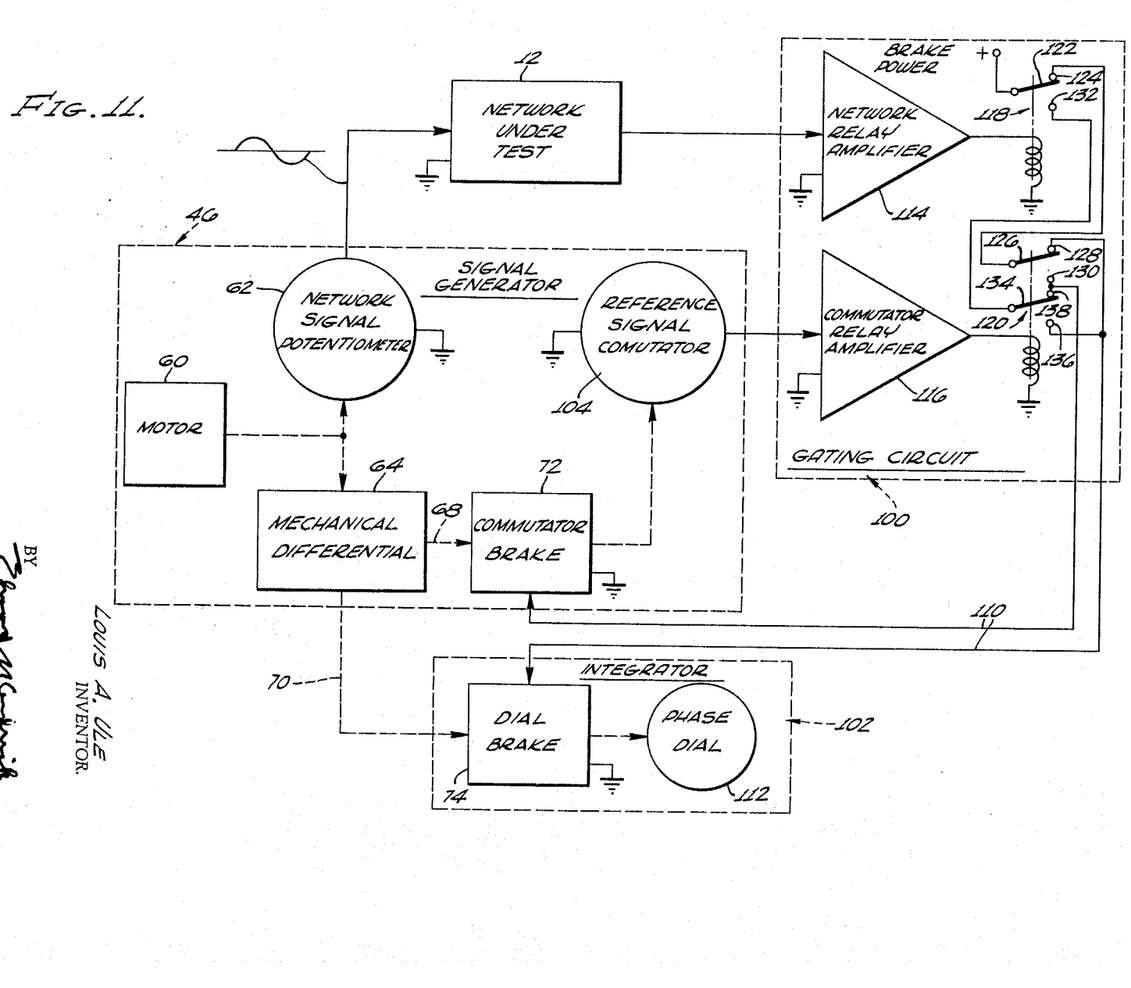
FIG. 11 is a block diagram of still another embodiment of the apparatus of the invention.
Figures 12, 14:
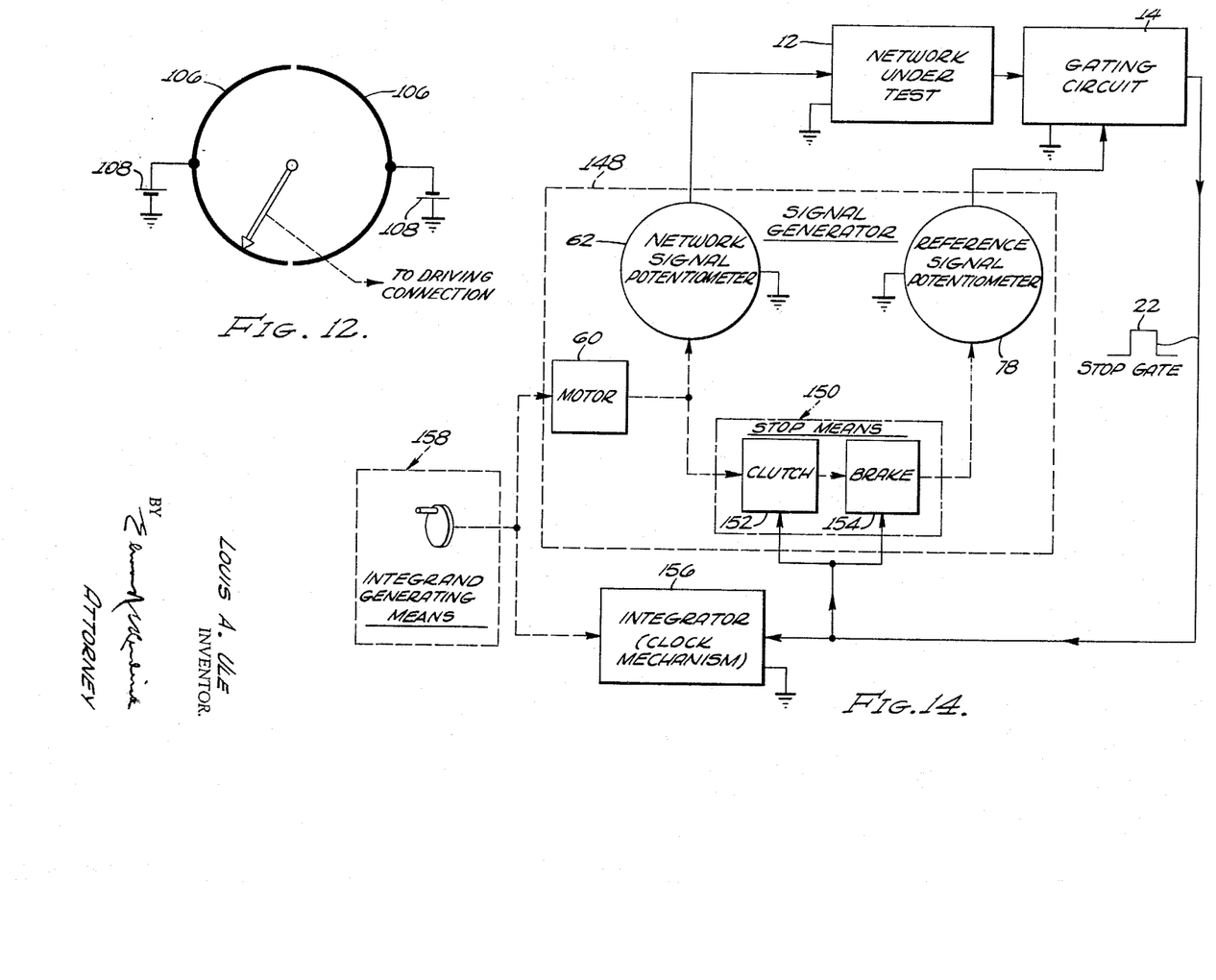
FIG. 12 is a schematic diagram of electrical apparatus which may be employed in the embodiment of the invention shown in FIG. 11.
FIGS. 14 and 15 are block diagrams of still other embodiments of the invention.

In FIG. 11 still another embodiment of the invention is shown including signal generator 46, network 12 and a different gating circuit 100 included with an integrator or indicator means 102. It is to be noted that indicator means and integrator may be used synonymously and that the word indicator herein denotes the use of any device employed to record, register or indicate the phase shift of the network 12. Signal generator 46 may be identical to the signal generator 46 shown in FIG. 7 except for a reference signal commutator 104 which is substituted for the reference signal potentiometer 78 shown in FIG. 7. A reference signal commutator may be substituted for the reference signal potentiometer 78 shown in FIG. 7 to improve the operation of the embodiment of the invention there illustrated. A diagrammatic view of a reference signal commutator 104 is shown in FIG. 12 including two comutator elements 106 which are respectively connected to oppositely poled sources of potential 108.

In the embodiment of the invention shown in FIG. 11, both commutator brake or reference signal brake 72 and counter or dial brake 74 are preferably normally in the unbraked state and are braked alternately by gating circuit 100 which produces stop gates on leads 110 alternately. Dial brake 74 is connected to a phase dial 112 in integrator 102 which may serve the same purpose and have a gear box internally thereof to indicate the phase shift of network 12 in a manner substantially the same as the counter 76 shown in FIG. 7. Phase dial may be provided with suitable indicia thereon with an index to travel adjacent the indicia, whereby a comparison may be made to determine the phase shift of network 12.

Gating circuit 100 includes two relay amplifiers 114 and 116 having relays 118 and 120 connected respectively to the outputs of amplifiers 114 and 116. Both amplifiers 114 and 116 energize relays 118 and 120 when respectively the outputs of network 12 and commutator 104 are of the same polarity. The gating provided by the contacts of each of the relays 118 and 120 serve to actuate dial brake 74 and deactuate commutator brake 72 to cause reference signal commutator 104 to be driven when the outputs of network 12 and commutator 104 are both positive or both negative. In the event that one is positive and the other is negative, commutator brake 72 is actuated to stop the generation of the reference or alternating signal output of commutator 104 and to permit mechanical differential 64 to drive phase dial 112 through dial brake 74 by second output means 70. It is to be noted that when the output of network 12 is negative, brake power will continue through a pole 122 of relay 118 to normally close contact 124 and to a pole 126 of relay 120. When the output of reference signal commutator 104 is also negative, relay 120 will be normally de-energized and a contact 128 normally closed to the pole 126 of relay 120 will provide a connection from brake power to dial brake 74 and reference signal commutator 104 will continue to be driven through commutator brake 72.

If the output of network 12 continues to be negative and the output of reference signal commutator 104 becomes positive, brake power will continue to pass through arm 122 and contact 124, relay 118 through arm 126 to a normally open contact 130 of relay 120 to commutator brake 72. This means that power will be transmitted from motor 60 through mechanical differential 64 at second output means 70 through unactuated dial brake 74 to phase dial 112 to indicate the delay or advance of the sinusoidal voltage impressed upon network 12 by signal generator 46.

Similarly, if the output of network 12 is positive, relay 18 will be energized and brake power will again be applied to dial brake 74 if the output of reference signal commutator 104 is also positive. This path will be through arm 122 of relay 118 and through contact 132 thereof to an arm 134 of relay 120 to a contact 136 of relay 120 directly to dial brake 74.

If the output of network 12 remains positive and the output of reference signal commutator 104 becomes negative, commutator brake 72 will be actuated through arm 122, contact 132, arm 134 and a contact 138 in relay 120.

Figure 13:
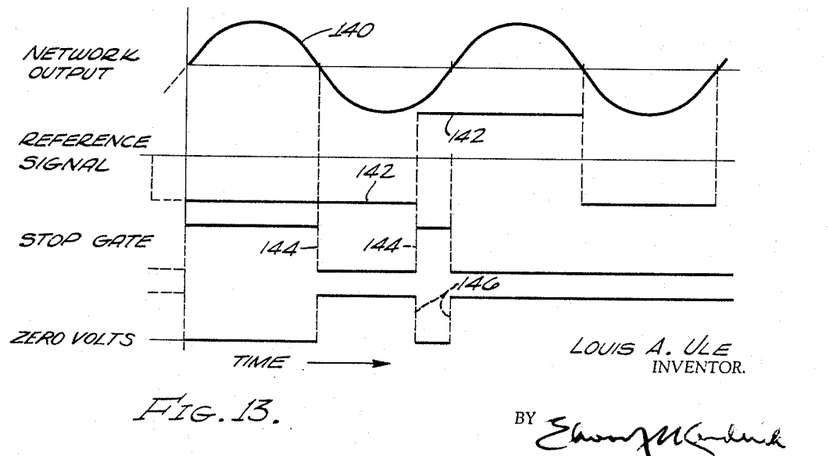
FIG. 13 is a graph of a group of waveforms characteristic of the operation of the embodiment of the invention shown in FIG. 11.

Typical operation of the embodiment of the invention shown in FIG. 11 is shown in FIG. 13. Network output is indicated at 140, the output of reference signal commutator 104 is indicated at 142, and stop gate outputs to commutator brake 72 is indicated at 144. It is to be noted that the negative output of reference signal commutator 104 at time=0 causes the movement of reference signal commutator to drop until the output of network 12 becomes negative. Movement of reference signal commutator 104 is then started again at the end of the first gate 144. Since the output of network 12 reverses in polarity before the output of reference signal commutator 104, movement of commutator arm in reference signal commutator 104 is again delayed when output 142 becomes positive and until the output of network 12 again becomes positive. As stated previously, stop gates 144 are impressed upon commutator brake 72. It is to be noted that the output potential of gating circuit 100 to dial brake 74 will be as indicated at 146. Thus, if both brakes 72 and 74 are normally unactuated, commutator brake 72 will be actuated when stop gates 144 are produced by gating circuit 100 and dial brake 74 will normally be deactuated. In addition, when brake 72 is deactuated, dial brake 74 will automatically be actuated.

In FIG. 14 still another signal generator 148 is shown including motor 60, network and reference signal potentiometers 62 and 78 and stop means 150 including a clutch 152 and a brake 154 which are simultaneously operated by stop gate 22 to stop the generation of a reference or alternating signal by reference signal potentiometer 78. Signal generator 148 is connected both to network 12 and gating circuit 14 as before which produces stop gate 22 that is impressed upon stop means 150 and an integrator 156 which may be provided with a clock-like mechanism with a mechanical escapement. Alternatively, the integrator 156 may include a sawtooth generator having an adjustable slope and a sampler to sample the output of the integrator at the end of the stop gate 22. Integrand generating means 158 may then be provided to control the speed of motor 60 and the speed of movement of the escapement or slope of the sawtooth generated by the sawtooth generator in integrator 156 simultaneously.

Figure 15:
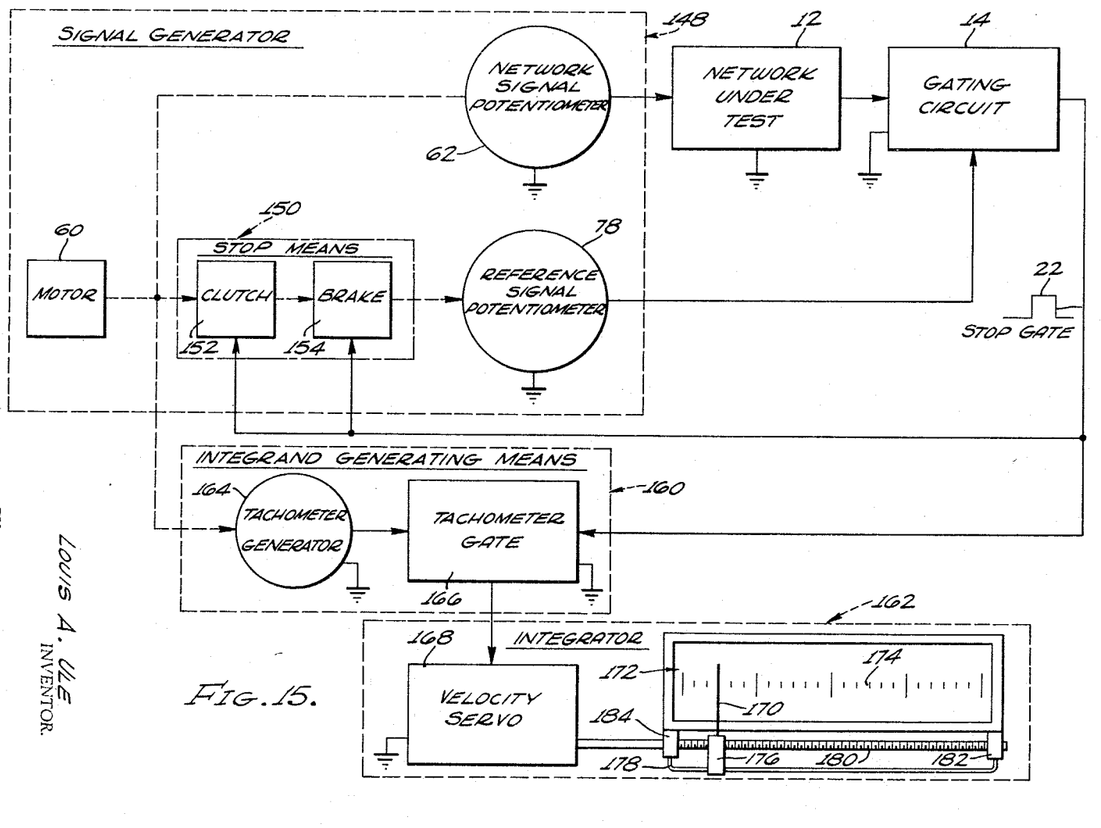

In the embodiment in FIG. 15, signal generator 148, network 12 and gating circuit may be appropriately connected to integrand generating means 160 which in turn is connected to an integrator 162. Both of the embodiments of the invention shown in FIG. 14 may be employed to correlate the frequency of both the sinusoidal voltage and alternating signal output of the signal generator 148 to the time width of stop gate 22. In FIG. 15, integrand generating means 160 includes a tachometer generator 164 which thereby produces an output signal proportional to the frequency of the sinusoidal and alternating signal outputs of signal generator 148. A tachometer gate 166 is then also included in integrand generating means 160 to pass the output signal of tachometer generator 164 to integrator 162 only during the time the stop gate 22 is generated. The output of tachometer gate 166 is then impressed upon a velocity servo 168 in integrator 162 which in turn moves an index 170 across the face of the dial 172 having indicia 174 thereon to indicate the phase shift of network 12. Velocity servo 168 moves index 170 across dial 172 at a rate proportional to the output signal amplitude of tachometer generator 164. Index 170 is fixed to a mounting 176 slidably mounted on a guide rod 178 and a threaded rod 180 to which mounting 176 is also threaded. The threaded shaft 180 extends through a first supporting bearing 182 and through a second supporting bearing 184 to velocity servo 168.

At a frequency of 1/10 cycle per second, the accuracy obtained with the use of an embodiment of the invention similar to that shown in FIG. 11 was of the order of one electrical degree phase shift. This error was due to a 2½ millisecond indeterminant response time of the relay amplifiers 114 and 116, and the indeterminant response time of the relays 118 and 120 and brakes 72 and 74 which may be operated by magnetic solenoids.

By the use of the embodiment shown in FIG. 7, for example, if two outputs were taken from brake amplifier 86 having stop gates recurring alternately and being impressed upon brakes 72 and 74, the only indeterminancy in the system would be the time response of the brakes 72 and 74. Hence, the accuracy of this system could easily be 0.1 degree at 0.1 cycle per second.

As stated previously, any embodiment of the invention may be so constructed to operate on several different types of logic, viz. as indicated in FIG. 1, network output signal 24 may be either in phase or out of phase with alternating signal 20, the stop gate 22 may be generated when the polarities of each signal are both positive, negative or different; and stop gate 22 may be generated when the sum of the signals 24 and 20 is either positive or negative. It is to be noted further that indicator means 16 may include means to combine the frequency of sinusoidal voltage 18 and alternating signal 20 with the stop gate 22 to produce indication independent of the frequency of this voltage and signal, or alternatively, the indicator may be provided with a dial as shown in FIG. 6 where the frequency of voltage 18 and signal 20 is not combined with gate 22.

The function of the embodiments of the invention shown in FIGS. 7, 11, 14 and 15 is simply to show that the frequency of sinusoidal voltage 18 and alternating signal 20 may be combined in indicator means 16 in any one of many convenient ways.

It is therefore seen that accurate measurements of the phase shift of network 12 may be made by the method of the invention described above. In addition, this method may be easily and quickly mechanized and performed by any one of the apparatuses shown in the drawings. Furthermore, measurement of the phase shift of network 12 to very low frequencies may be made with a great deal of facility and the indicator means 60 may be made to read directly in degrees with one scale and independently of the frequency of sinusoidal voltage 18 and alternating signal 20 if this frequency is combined as indicated in the above-mentioned figures.

Although several specific embodiments of the invention have been shown and described for purposes of illustration, other changes and modifications of the invention will, of course, suggest themselves to those skilled in the art. Thus, the invention should not be limited to the specific embodiments shown and described since the true scope of the invention is defined only in the appended claims.

What is claimed is:

1. A phase meter for use in measuring the phase shift of a network to be tested, said phase meter comprising: a signal generator for both impressing a sinusoidal voltage on said network to produce an output signal therefrom and for producing an alternating signal synchronously with said sinusoidal voltage having half-periods equal to half-periods of said sinusoidal voltage, a gating circuit responsive to said network output signal and to said alternating signal for impressing a stop gate on said signal generator to stop the generation of said alternating signal at a time when the amplitudes of said signals bear a predetermined relationship with respect to each other, and means responsive to said stop gate for indicating its time width.

2. The invention as defined in claim 1, wherein said alternating signal is also a sinusoidal voltage, and wherein said predetermined relationship of the amplitudes of said output and alternating signals is defined as the condition under which the sum of said signals is a signal having an algebraic sign of a predetermined polarity.

3. The invention as defined in claim 1, wherein said alternating signal is also a sinusoidal voltage, and wherein said predetermined relationship of the amplitudes of said signals is defined as the condition under which the difference of said signals is a signal having an algebraic sign of a predetermined polarity.

4. The invention as defined in claim 1, wherein said gating circuit is a voltage divider connected at its opposite ends to the output of said network and the alternating signal output of said signal generator, and an amplifier connected to the tap on said voltage divider, said tap having a position of zero potential when said network output and said alternating signals are 180 electrical degrees out of phase.

5. A phase meter for use in measuring the phase shift of a network to be tested, said phase meter comprising: a signal generator for both impressing a sinusoidal voltage on said network to produce an output signal therefrom and for producing an alternating signal synchronously with said sinusoidal voltage having half-periods equal to half-periods of said sinusoidal voltage, a gating circuit responsive to said network output signal and to said alternating signal for impressing a stop gate on said signal generator to stop the generation of said alternating signal at a time when the amplitudes of said signals bear a predetermined relationship with respect to each other, means responsive to said stop gate for indicating its time width, said signal generator including a motor having a driving mechanism, first means responsive to the movement of said driving mechanism for generating said sinusoidal voltage, second means responsive to the movement of said driving mechanism for generating said alternating signal, and third means responsive to said stop gate to stop the mechanical movement of said second means without stopping the mechanical movement or operation of said driving mechanism or said first means.

6. The invention as defined in claim 5, wherein said indicator means includes an integrator with respect to time, and wherein the following are additionally provided: a fourth means to impress an integrand signal on said integrator proportional to the frequency of said sinusoidal voltage and said alternating signal, and fifth means responsive to said stop gate for gating said integrand signal to said indicator only when said stop gate is generated.

7. The invention as defined in claim 6, wherein said fourth means includes a mechanical differential in said signal generator having input means connected from said driving mechanism, first output means connected through said third means to said second means, and second output means connected to said integrator; wherein said integrator includes means to indicate the displacement of a mechancial movement; and wherein said fifth means is connected between said second output means of said mechanical differential and said indicator to prevent movement of said indicator by said mechanical differential in response to the movement of said driving mechanism except when said stop gate is generated, said integrand signal being representative of the rate of movement of said second output means of said mechanical differential.

8. The invention as defined in claim 6, wherein said fourth means includes sixth means to adjust the magnitude of said integrand signal in proportion to the speed of said motor.

9. The invention as defined in claim 8, wherein said sixth means includes manual means for adjustment of the magnitude of said integrand signal and for adjustment of the speed of said motor simultaneously.

10. The invention as defined in claim 8, wherein said sixth means includes a tachometer type generator connected from said driving means.

11. The invention as defined in claim 6, wherein said fourth means includes a tachometer type generator connected from said driving means, and a tachometer gate for passing the output voltage of said tachometer generator to said integrator only during the time said stop gate is generated; and wherein said integrator includes dial means having indicia thereon and an index movably mounted adjacent said dial means to indicate the phase shift of said sinusoidal voltage through said network, and a velocity servo responsive to the output of said tachometer gate for moving said index with respect to said dial at a rate proportional to the output voltage of said tachometer, but only during the time that said stop gate is generated.

12. A network phase shift detection system comprising: a signal generator for impressing a first alternating electrical signal on said network to produce an output signal therefrom and for producing a second alternating electrical signal; and means responsive to said network output signal and to said alternating signal for impressing a control signal on said signal generator to arrest the alternation of said second alternating signal in a manner such as to preserve the instantaneous amplitude of said second alternating signal when said control signal is impressed on said signal generator and for a length of time that the amplitudes of said second alternating signal and said network output signal bear a predetermined relationship with respect to each other.

13. A phase meter for use in measuring phase shift of a network to be tested, said phase meter comprising: a signal generator for impressing a periodic voltage on said network to produce an output signal therefrom and for producing a periodic signal; and means responsive to said network output signal and to said periodic signal for impressing a control signal on said signal generator to stop the generation of said periodic signal at a time when the amplitudes of said signals bear a predetermined relationship with respect to each other.

14. A phase meter for use in measuring the phase shift of a network to be tested, said phase meter comprising: a signal generator for impressing a periodic voltage on said network to produce an output signal therefrom and for producing a periodic signal synchronously with said periodic voltage, said periodic voltage having half periods equal to each other, said periodic signal also having half periods equal to each other, the half periods of said periodic voltage also being equal to the half periods of said periodic signal; and means responsive to said network output signal and to said periodic signal for impressing a control signal on said signal generator to stop the generation of said periodic signal at a time when the amplitudes of said signals bear a predetermined relaitonship with respect to each other.

15. A phase meter for use in measuring the phase shift of a network to be tested, said phase meter comprising: a signal generator for impressing a periodic voltage on said network to produce an output signal therefrom and for producing a periodic signal synchronously with said periodic voltage, said periodic voltage having half periods equal to each other, said periodic signal also having half periods equal to each other, the half periods of said periodic voltage also being equal to the half periods of said periodic signal; a gating circuit responsive to said network output signal and to said periodic signal for impressing a stop gate on said signal generator to stop the generation of said periodic signal at a time when the amplitudes of said signals bear a predetermined relationship to each other; and means responsive to said stop gate for indicating its time width.

16. A phase meter for use in measuring the phase shift of a network to be tested, said phase meter comprising: a signal generator for both impressing a sinusoidal voltage on said network to produce an output signal therefrom and for producing an alternating signal synchonously with said sinusoidal voltage having half-periods equal to half-periods of said sinusoidal voltage, a gating circuit responsive to said network output signal and to said alternating signal for impressing a stop gate on said signal generator to stop the generation of said alternating signal at a time when the amplitudes of said signals bear a predetermined relationship with respect to each other, and means responsive to said stop gate for indicating its time width, said indicator means being provided with an index and a dial having several rows of indicia thereon corresponding to direrent frequencies of said sinusoidal voltage and said alternating signal.

17. A phase meter for use in measuring the phase shift of a network to be tested, said phase meter comprising: a signal generator for both impressing a sinusoidal voltage on said network to produce an output signal therefrom and for producing an alternating signal synchonously with said sinusoidal voltage having half-periods equal to half-periods of said sinusoidal voltage, a gating circuit responsive to said network output signal and to said alternating signal for impressing a stop gate on said signal generator to stop the generation of said alternating signal at a time when the amplitudes of said signals bear a predetermined relationship with respect to each other, means responsive to said stop gate for indicating its time width, said indicator means including an integrator with respect to time, means to impress an integrand signal on said indicator proportional to the frequency of said sinusoidal voltage and said alternating signal, and means responsive to said stop gate for gating said integrand signal to said integrator only when the stop gate is generated.

18. A phase meter for use in measuring the phase shift of a network to be tested, said phase meter comprising: a signal generator for both impressing a sinusoidal voltage on said network to produce an output signal therefrom and for producing an alternating signal synchronously with said sinusoidal voltage having half-periods equal to half-periods of said sinusoidal voltage, a gating circuit responsive to said network output signal and to said alternating signal for impressing a stop gate on said signal generator to stop the generation of said alternating signal at a time when the polarities of said signals bear a predetermined relationship with respect to each other, and means responsive to said stop gate for indicating its time width.

19. A phase meter for use in measuring the phase shift of a network to be tested, said phase meter comprising: a signal generator for both impressing a sinusoidal voltage on said network to produce an output signal therefrom and for producing an alternating signal synchronously with said sinusoidal voltage having half-periods equal to half-periods of said sinusoidal voltage, a gating circuit responsive to said network output signal and to said alternating signal for impressing a stop gate on said signal generator to stop the generation of said alternating signal at a time when the polarities of said signals are different, and means responsive to said stop gate for indicating its time width.

20. A phase meter for use in measuring the phase shift of a network to be tested, said phase meter comprising: a signal generator for both impressing a sinusoidal voltage on said network to produce an output signal therefrom and for producing an alternating signal synchronously with said sinusoidal voltage having half-periods equal to half-periods of said sinusoidal voltage, a gating circuit responsive to said network output signal and to said alternating signal for impressing a stop gate on said signal generator to stop the generation of said alternating signal at a time when one of said signals has only a positive polarity with respect to a predetermined reference level and the other of said signals simultaneously has only a negative polarity with respect to said reference level.

21. A phase meter for use in measuring the phase shift of a network to be tested, said phase meter comprising: a signal generator for both impressing a sinusoidal voltage on said network to produce an output signal therefrom and for producing an alternating signal synchronously with said sinusoidal voltage having half-periods equal to half-periods of said sinusoidal voltage, a gating circuit responsive to said network output signal and to said alternating signal for impressing a stop gate on said signal generator to stop the generation of said alternating signal at times both when one of said signals has a polarity positive with respect to a predetermined reference level and simultaneously the other of said signals has a polarity negative with respect to said reference level, and when said one signal has a polarity negative with respect to said reference level and simultaneously said other signal has a polarity positive with respect to said reference level.

References Cited in the file of this patent

UNITED STATES PATENTS 2,422,074   Bond ------------------ June 10, 1947

UNITED STATES PATENT OFFICE
CERTIFICATE OF CORRECTION

Patent No. 3,005,151                              October 17, 1961

Louis A. Ule

It is hereby certified that error appears in the above numbered patent requiring correction and that the said Letters Patent should read as corrected below.

Column 4, line 4, after "circuit" insert -- 14 --; line 36, after "signal" insert -- 20 --; same column 4, line 65, for "are" read -- is --; column 6, line 34, after "brake" insert -- 74 --; column 7, line 51, for "comutator" read -- commutator --; column 8, line 70, for "by" read -- to --; column 12, line 43, for "direrent" read -- different --.

Signed and sealed this 3rd day of July 1962.

(SEAL)
Attest:

ERNEST W. SWIDER                            DAVID L. LADD
Attesting Officer                              Commissioner of Patents